United States Patent

Froning et al.

Patent Number: 5,177,859
Date of Patent: Jan. 12, 1993

[54] METHOD FOR MANUFACTURING HIGH-PRECISION END FACES ON WAVEGUIDES

[75] Inventors: Edilbert Froning, Oberruhldingen; Klaus Langner, Überlingen, both of Fed. Rep. of Germany

[73] Assignee: Bodenseewerk Gerätetechnik GmbH, Fed. Rep. of Germany

[21] Appl. No.: 688,724

[22] Filed: Apr. 19, 1991

[30] Foreign Application Priority Data

Apr. 21, 1990 [DE] Fed. Rep. of Germany ........ 4012747

[51] Int. Cl.$^5$ ............................................. H01P 11/00
[52] U.S. Cl. ........................................ 29/600; 385/49; 385/73; 385/85
[58] Field of Search ....................... 29/600; 385/49, 73, 385/85; 156/73.2; 264/261

[56] References Cited

U.S. PATENT DOCUMENTS 4,182,545 1/1980 Greer ................................ 385/49 X
4,744,619 5/1988 Cameron ........................... 385/49 X
4,953,936 9/1990 Regener et al. ...................... 385/49

FOREIGN PATENT DOCUMENTS 0058461 3/1984 European Pat. Off. .
0170457 2/1986 European Pat. Off. .
0276599 8/1988 European Pat. Off. .
2248587 4/1974 Fed. Rep. of Germany .

Primary Examiner—Carl J. Arbes
Attorney, Agent, or Firm—Lee, Mann, Smith, McWilliams, Sweeney & Ohlson

[57] ABSTRACT

A method for manufacturing high-precision end faces on waveguides, by which the end face of a waveguide formed in a substrate contains microscopically small fractures due to mechanical processing, is characterized by the procedural steps: place a body (20) having a high-precision surface against the substrate (10) in front of the end face of the waveguide (12); introducing an adhesive (22) into the space between the end face of the waveguide (12) and the high-precision surface of the body (20); and allowing the adhesive (22) to set.

8 Claims, 4 Drawing Sheets undisturbed light throughpassage

METHOD FOR MANUFACTURING HIGH-PRECISION END FACES ON WAVEGUIDES

TECHNICAL FIELD

The invention relates to a method for manufacturing high-precision end faces on waveguides, by which the end face of a waveguide formed in a substrate contains microscopically small fractures due to mechanical processing.

BACKGROUND ART

In an integrated optical system, the problem exists to conduct light from such a waveguide located on components, e.g. a photoelectric detector, or to feed light from a light source, e.g. a semiconductor laser, into a waveguide. The light must thereby exit through the end face of the waveguide end or enter into this end face.

When edges of a glass substrate are mechanically processed microscopically small fractures are produced. The exiting light is scattered through these fractures. In order to prevent the scattering, the waveguide end is polished with conventional means. This is a very expensive procedure which requires specialized personnel.

In many cases it is desired to couple a waveguide inside an integrated optical system with components. To this end, small grooves can be milled in the substrate by means of a diamond impregnated disk milling cutter. The side walls of these grooves also form roughly cracked edges. These internally located cracked edges cannot, however, be polished and would therefore be unusable as coupling locations.

DISCLOSURE OF THE INVENTION

It is the object of the invention to provide a simple and effective method for manufacturing high-precision end faces on waveguides.

According to the invention, this object is achieved by means of the following procedural steps:
(a) Placing a body having a high-precision surface on the substrate in front of the end face of the waveguide,
(b) Introducing an adhesive into the space between the end face of the wave guide and the high-precision surface of the body and
(c) Allowing the adhesive to set.

The fissured edges on the end face of the waveguide are "filled" with an adhesive coat, which on its part has a smooth surface. It has been shown that a clean entry and exit of the light through the end face of the waveguide can be effected in this way.

Variations of the invention are subject of the subclaims.

An embodiment of the invention will be explained in greater detail hereinbelow with reference to the accompanying drawings.

PREFERRED IMPLEMENTATION OF THE INVENTION

A substrate composed of glass is designated by 10. A waveguide 12 is formed under the surface of the substrate 10. The waveguide 12 is an area extending out lengthwise and having a rather circular cross-section, in which a refractive index exists which is increased in comparison to the reftactive index of the substrate 10. In such a waveguide, light is conducted by means of total reflection, as is illustrated by the arrow 14. A groove 16 is milled into the substrate 10. An electro-optical component, e.g. a photodiode or a semiconductor laser, should be placed in this groove. This component should be optically coupled with the waveguide 12.

Figure 1:
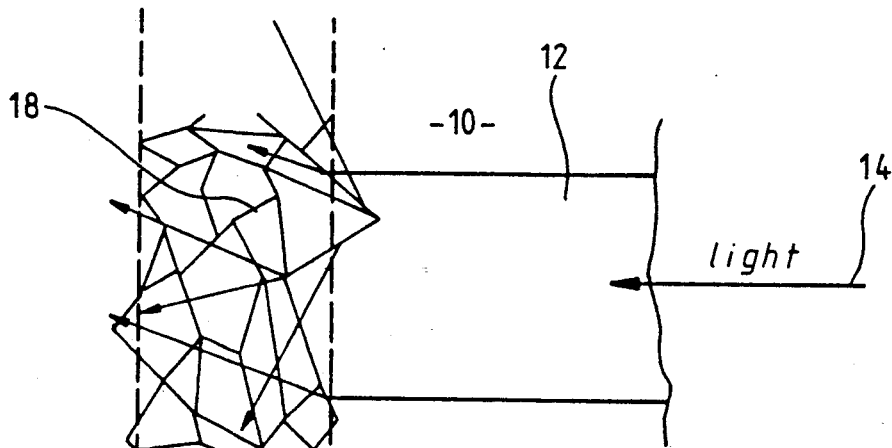
FIG. 1 shows a top plan view of the end of a light guide, which extends under the surface of a substrate made of glass and forms a fissured edge at the substrate's end face.
Figure 2:
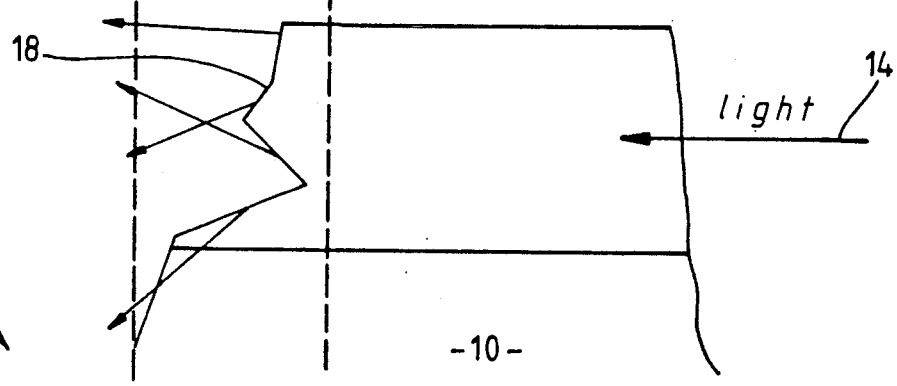
FIG. 2 shows an associated side view.
Figure 3:
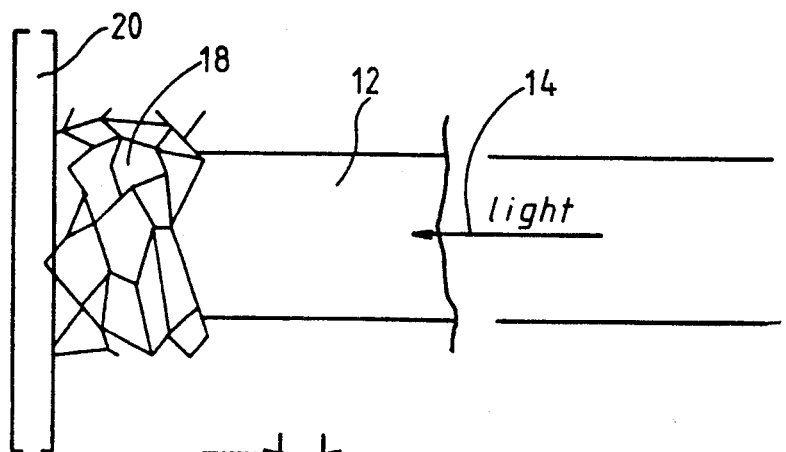
FIG. 3 shows in a top plan view similar to FIG. 1 the placement of a microscope cover glass on the end face of the waveguide.
Figure 4:
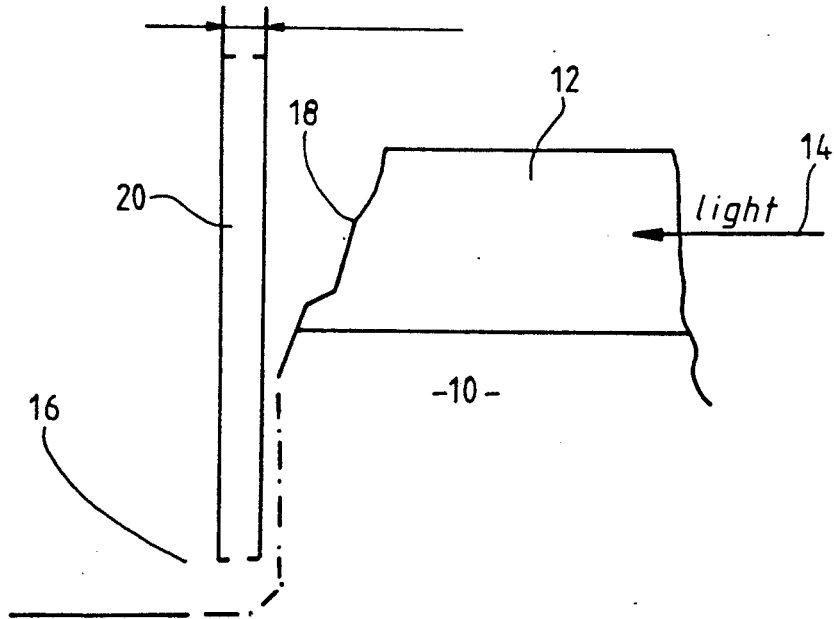
FIG. 4 shows an associated side view.

The end face of the waveguide 12 forms an uneven cracked edge 18. The light which has been conducted into the waveguide 12 is unevenly broken and scattered at this cracked edge, as is indicated in FIGS. 1 and 2. A clean coupling of the waveguide 12 to a photodiode, for example, is thereby not possible.

For this reason, a body 20 having a smooth surface is pressed against the uneven end face of the waveguide 12. A drawn glass in the form of a microscope cover glass has proven to serve as such a body. Drawn glass has a flame polish which has a high-quality microstructure. A microscope cover glass has a thickness of approximately 0.15 mm. The microscope cover glass can, therefore, be fitted easily into the milled groove having a width of 0.5 mm. Using suitable means, the body 20 is pressed against the uneven end face of the waveguide 12.

Advantageously, the microscope cover glass is coated with a separating agent.

Figure 5:
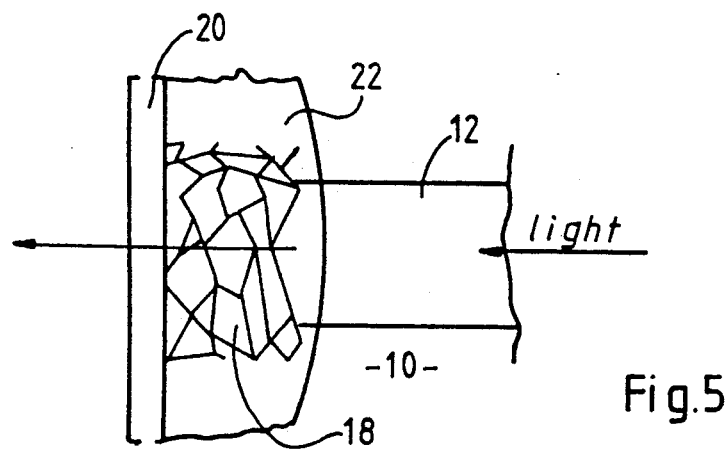
FIG. 5 shows in a top plan view similar to FIGS. 1 and 3 the introduction of an adhesive into the space between the end face of the waveguide and the microscope cover glass.
Figure 6:
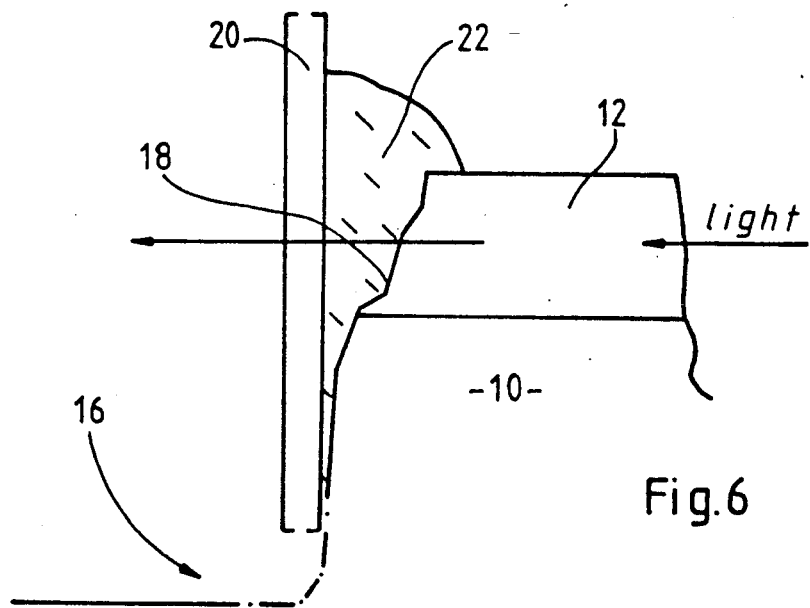
FIG. 6 shows an associated side view.

A liquid adhesive 22 is then introduced into the space between the microscope cover glass and the end face of the waveguide, as is illustrated in FIGS. 5 and 6. This can be effected by means of a needle or a microdosing apparatus. The adhesive 22 is thereby drawn into the narrow space by means of the capillary force. The adhesive has a low refractive index which conforms to the refractive index of the waveguide 12. The adhesive 22 can be set by UV radiation. It is set through UV irradiation.

Figure 7:
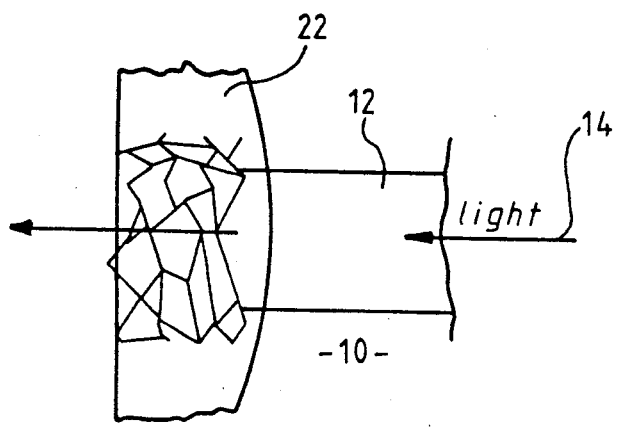
FIG. 7 shows a top plan view of the end of the waveguide with an end face smoothened by means of the adhesive after the microscope cover glass has been removed.
Figure 8:
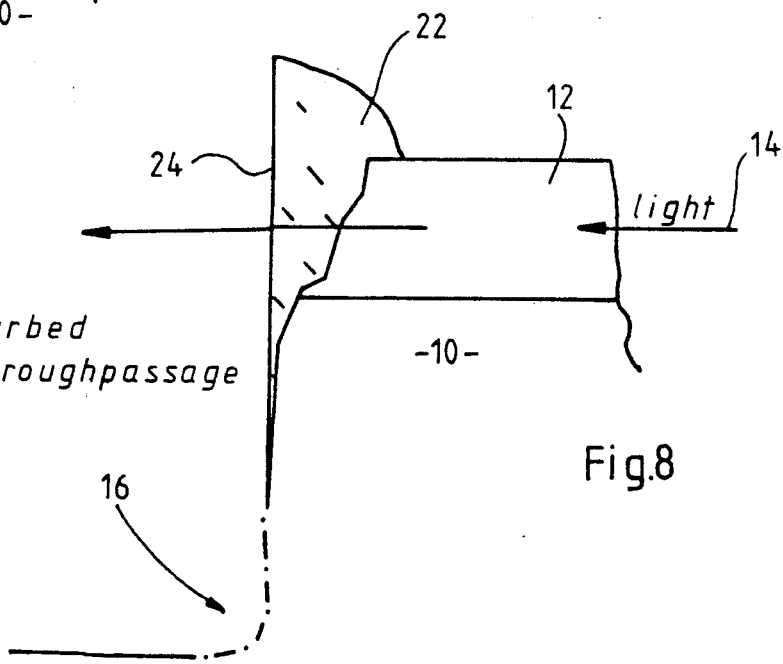
FIG. 8 shows an associated side view.

The microscope cover glass is removed after the adhesive sets. The removal is facilitated by the separating agent. The structure as illustrated in FIGS. 7 and 8 then ensues. The adhesive forms a smooth surface 24. By means of the adhesion of the adhesive 22, the thus formed edge protrudes upwards somewhat. The waveguide 12 ends virtually without a change in the refractive index in the adhesive 22.

The light which is conducted in the waveguide 12 exits at the smooth surface 24 of the adhesive without scattering or diffuse refraction. It is non-critical if the surface 24 is slightly off-set against the axis of the waveguide 12.

A direct coupling or decoupling of the light is possible at the smooth surface 24.

The same method can also be utilized with sawed, broken, cut, or milled outer edges of substrates. The level of expenditure which is required with the current technology can be avoided.

We claim:

1. A method for manufacturing high-precision end faces on waveguides of the type wherein a waveguide is formed in a substrate and has an end face containing microscopically small fractures caused by mechanical processing, comprising the steps of:
   (a) Placing a body (20) having a high-precision surface on the substrate (10) in front of the end face of the waveguide (12),
   (b) Introducing an adhesive (22) into the space between the end face of the waveguide (12) and the high-precision surface of the body (20) and
   (c) Allowing the adhesive (22) to set.

2. The method as claimed in claim 1, characterized in that the body (20) is removed after the adhesive has set.

3. The method as claimed in claim 1, characterized in that an adhesive with a low refractive index is used as adhesive.

4. The method as claimed in claim 1, characterized in that the body (20) is a drawn glass such as a microscope cover glass.

5. The method as claimed in claim 1, characterized in that the mechanical processing is a milling process.

6. The method as claimed in claim 1, characterized in that the adhesive is introduced into the space between the cracked edges (18) and the surface of the body (20) through capillary force.

7. The method as claimed in claim 1, characterized in that an adhesive which is UV-hardened is used as adhesive.

8. The method as claimed in claim 1, characterized in that a separating agent is deposited on the surface of the body (20), which permits the loosening of this surface from the surface of the hardened adhesive after the adhesive has set.

* * * * *